United States Patent [19]
McNaughton et al.

[11] Patent Number: 5,303,963
[45] Date of Patent: Apr. 19, 1994

[54] TUBE COUPLING WITH SECONDARY RETAINER CLIP

[75] Inventors: James McNaughton, Rochester; David R. Helsing, Mt. Clemens, both of Mich.

[73] Assignee: Bundy Corporation, Warren, Mich.

[21] Appl. No.: 858,826

[22] Filed: Mar. 27, 1992

[51] Int. Cl.⁵ ............................................. A16L 21/08
[52] U.S. Cl. .................................. 285/319; 285/161; 285/921
[58] Field of Search ................. 285/319, 921, 924, 161

[56] References Cited

U.S. PATENT DOCUMENTS

| | | | |
|---|---|---|---|
| 3,785,682 | 1/1974 | Schaller et al. | 285/921 X |
| 4,135,745 | 1/1979 | Dehar | 285/921 X |
| 4,679,832 | 7/1987 | Meinig | 285/921 X |
| 4,743,051 | 5/1988 | Proni | 285/921 X |
| 4,747,621 | 5/1988 | Gans | 285/921 X |
| 4,948,175 | 8/1990 | Bartholomew | 285/319 X |
| 4,948,180 | 8/1990 | Usui et al. | 285/319 |
| 5,069,489 | 12/1991 | Bartholomew | 285/319 |
| 5,161,830 | 11/1992 | Abe | 285/921 X |

FOREIGN PATENT DOCUMENTS 2633029 12/1989 Fed. Rep. of Germany ...... 285/319

*Primary Examiner*—Dave W. Arola
*Attorney, Agent, or Firm*—Kinzer, Plyer, Dorn McEachran & Jambor

[57] ABSTRACT

A fluid connector comprises a pair of retainers, with a first retainer having a pair of resilient legs extending axially and radially inwardly from an axially outer portion of a housing bore. The first retainer abuts a first upset portion on the tube to secure the tube within the housing. A secondary retainer is positioned axially outwardly of the first retainer, and has legs which also abut a second upset portion on the tube also securing the tube within the housing. The secondary retainer legs preferably extend parallel to the axis of the tube, such that they provide a strong resistance force against pull-out of the tube.

8 Claims, 2 Drawing Sheets

TUBE COUPLING WITH SECONDARY RETAINER CLIP

BACKGROUND OF THE INVENTION

This application in general relates to quick connect fluid couplings for retaining a tube within a housing.

Quick connect coupling are known in the prior art wherein a retainer is received within a housing and secures a tube within the housing. The retainer typically has a plurality of resilient legs extending radially and axially inwardly from an entrance bore of the housing. The tube typically has an upset portion with an outer diameter greater than the nominal outer diameter of the tubing. The tube is inserted into the housing, with the upset portion abutting inner peripheral surfaces of the legs, and flexing them radially outwardly. The upset portion may then move axially beyond an axially inner end of the legs. At that time, the legs resiliently flex radially inwardly, and abut an axially outer surface of the upset portion, retaining the tube within the housing. Such couplings are widely used in the prior art, and have proven quite successful.

The prior art has sometimes experienced failures of such retainers, which allow the tube to move back outwardly of the housing. This is undesirable.

SUMMARY OF THE INVENTION

In a disclosed embodiment of the present invention, a retainer is positioned within a housing. A tube having a first upset portion is received within the housing. The retainer has resilient legs abutting an axially outer surface of the upset portion. A secondary retainer is positioned axially outwardly of the housing, and has legs which abut an upset portion of the tube, also securing the tube within the housing.

In preferred embodiments of the present invention, the secondary retainer abuts a distinct second upset portion which is positioned axially outwardly from the first upset portion. Further, the secondary retainer preferably has clip members at circumferentially spaced locations which snap onto a flange formed at an outer peripheral surface of the housing. The secondary retainer preferably has a plurality of relatively rigid securing legs extending generally parallel to an axis of the tube.

In one embodiment of the present invention, the housing is threadably connected to an adapter within a coolant tube in the radiator of a vehicle. Such tube may be used to communicate automatic transmission fluid to the radiator for cooling. The fluid within such lines will often reach high pressures, and the use of the secondary retainer provides a secure connection between the tube and the housing.

These and other features of the present invention can be best understood from the following specification and drawings, of which the following is a brief description.

DETAILED DESCRIPTION OF A PREFERRED EMBODIMENT

Figure 1:
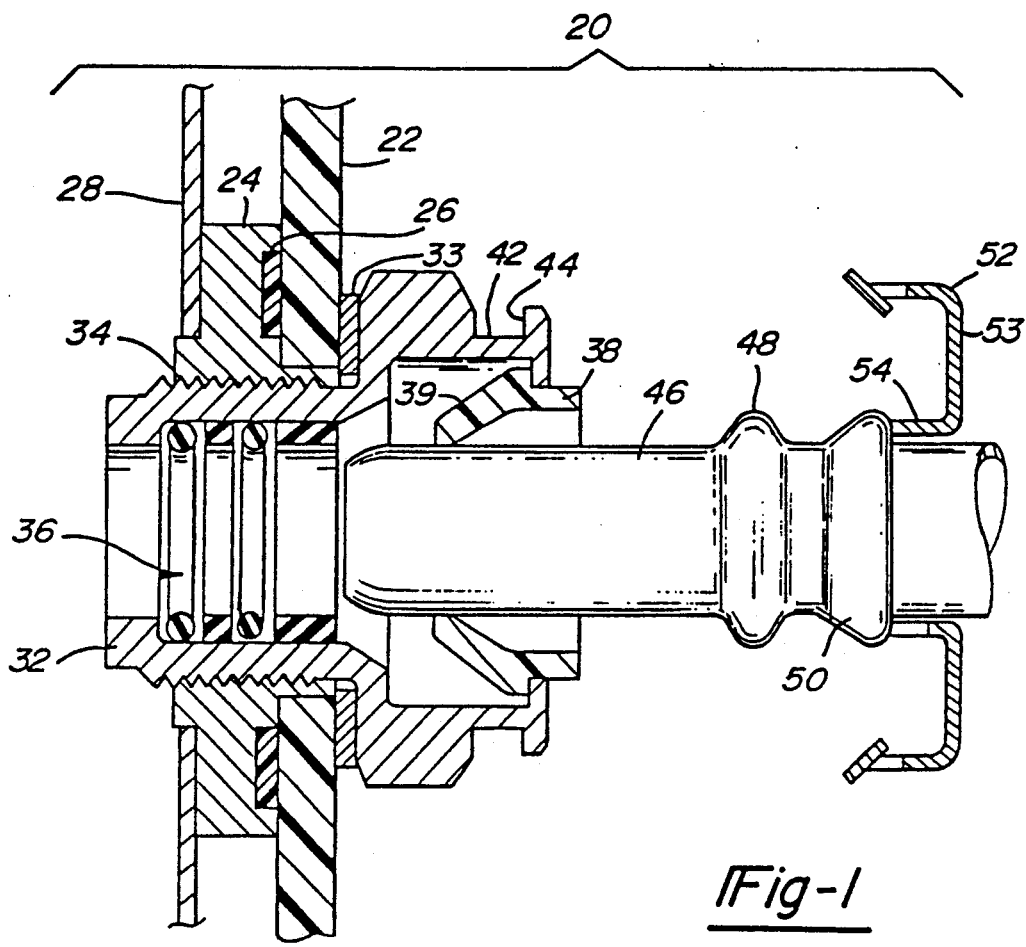
FIG. 1 is a cross-sectional assembly view of a coupling according to the present invention.

A quick connect coupling 20 is illustrated in FIG. 1 mounted to an outer plate 22. An adapter 24 has a gasket 26 sealing the fluid surface between adapter 24 and plate 22. Housing plate 28 is spaced axially inwardly of adapter 24. A retainer housing 32 is formed with threads 34 which are received within adapter 24. A seal 33 seals the interface between retainer housing 32 and plate 22.

A seal package 36 is received within retainer housing 32. A primary retainer 38 having a plurality of resilient legs 39 is positioned within housing 32, and abuts an inner flange 40 adjacent an entrance to housing bore 41. Retainer housing 32 also has an outer channel 42, and an outer flange 44. A tube 46 is received within housing bore 41, and has a first upset portion 48 which is forced inwardly of housing bore 41 and biases legs 39 radially outwardly. Once first upset portion 48 has moved axially beyond legs 39, the legs 39 flex radially inwardly and abut an axially outer surface of first upset portion 48.

A second upset portion 50 is positioned axially outwardly of first upset portion 48. A secondary retainer clip 52 is positioned axially outwardly of second upset portion 50. Secondary retainer clip 52 has an axially outer ring portion 53 with legs 54 extending axially inwardly from a radially inner portion. When assembled, second legs 54 will abut second upset portion 50, such that there is a double securement of tube 46 within bore 41.

Figure 2:
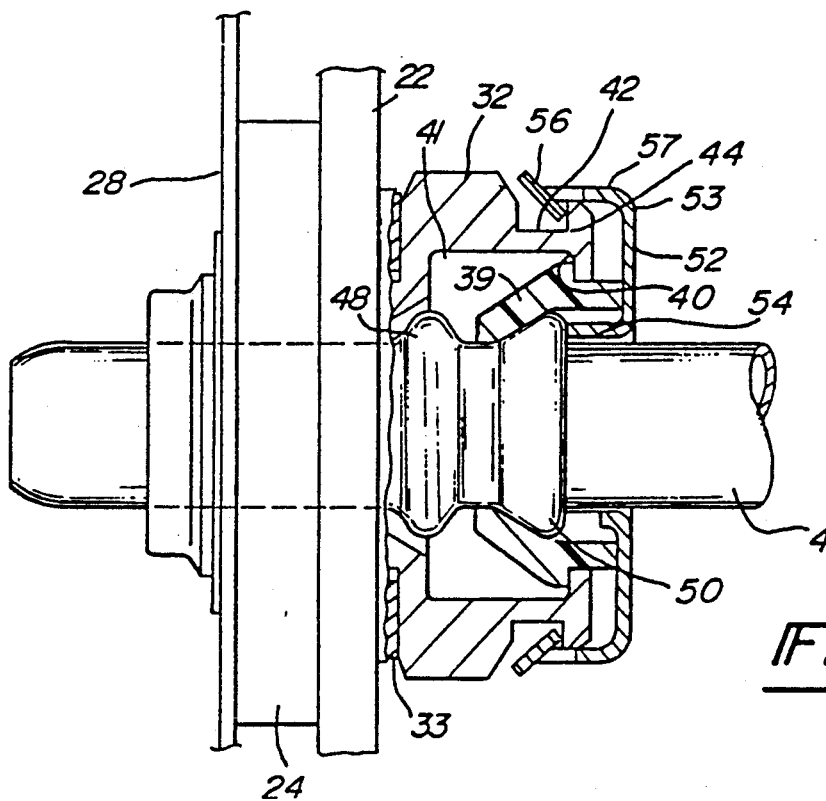
FIG. 2 is an assembled view, partially in cross-section, of the coupling shown in FIG. 1.

As shown in FIG. 2, when tube 46 is received within housing bore 41, legs 39 abut first upset portion 48, and legs 54 abut second upset portion 50. Legs 54 extend generally parallel to an axis of tube 46, providing maximum resistance to tube removal. Clips 56 for securing secondary retainer clip 52 extend axially and radially outwardly at an angle from a clip extension 57 which extends generally parallel to the axis of tube 46. Clips 56 abut outer flange 44 and are received within outer channel 42 securing secondary retainer clip 52 on retainer housing 32.

Figure 3:
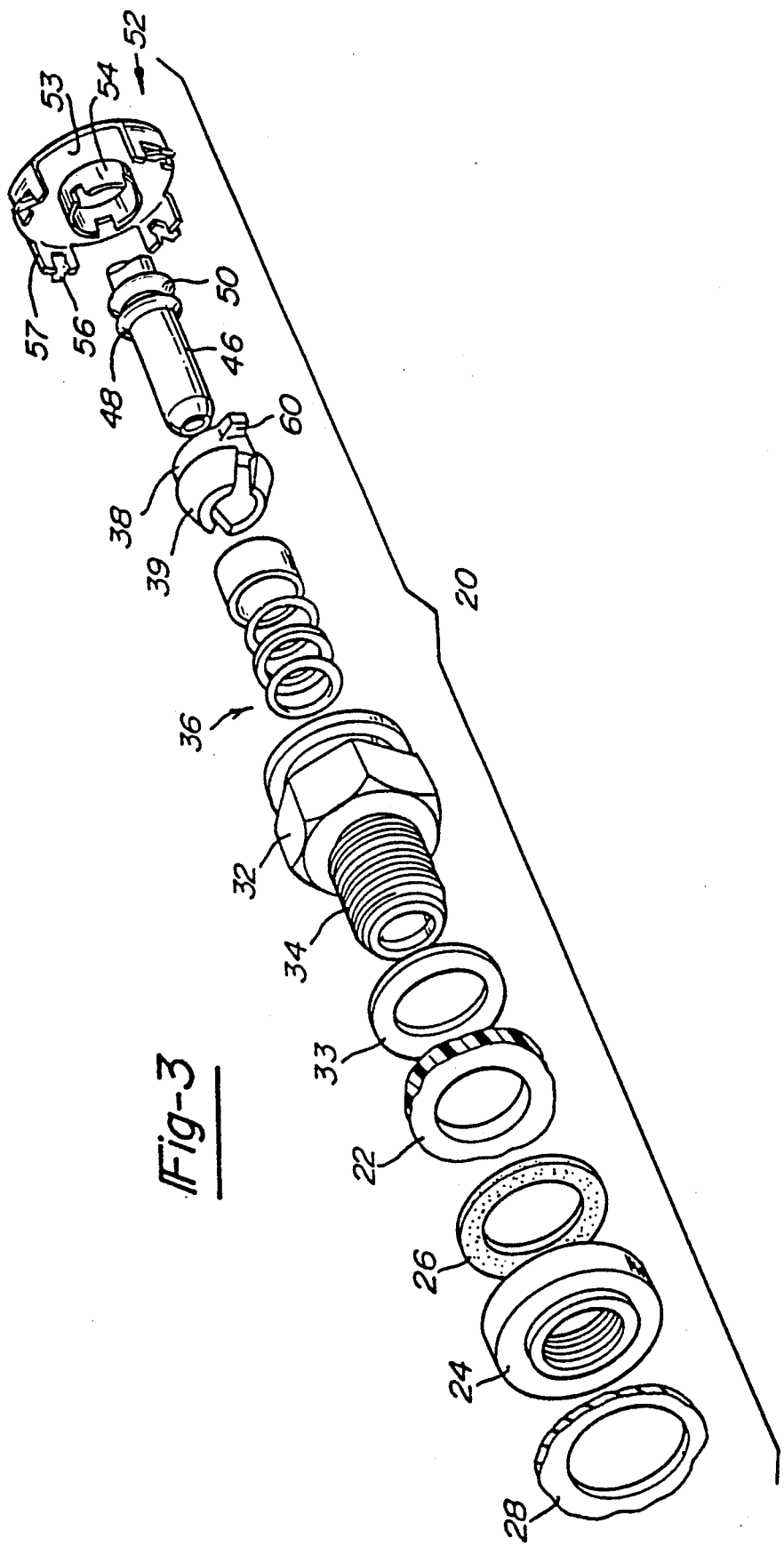
FIG. 3 is an exploded view of the inventive coupling.

As shown in FIG. 3, tube 46 has upset portions 48 and 50. Secondary retainer clip 52 has clip extensions 57 with clips 56 extending axially and radially outwardly, and also has three spaced retainer legs 54 which extend generally parallel to an axis of tube 46. Flange 60 is received outside the housing 32 to hold retainer 38 on housing 32.

In assembling quick connector 20, primary retainer 38 is initially positioned within retainer housing 32. Tube 46 is then forced axially inwardly with first upset portion 48 flexing legs 39 radially outwardly to allow passage of first upset portion 48. Once first upset portion 48 has moved axially beyond the axially inner end of legs 39, legs 39 flex radially inwardly and abut an axially outer surface of first upset portion 48. Secondary retainer clip 52 is preferably carried on tube 46 at a position axially outwardly of second upset portion 50. After tube 46 has been moved axially into bore 41, and legs 39 abut first upset portion 48, clip 52 is snapped into the housing bore 41, with clips 56 snapping behind outer flange 44. At that location, legs 54 abut second upset portion 50, firmly securing tube 46 within housing bore 41.

Although the connector 20 has been disclosed for use on a secondary coolant line in a radiator, the teachings of this invention would extend to any relatively high pressure fluid line. Further, although tube 46 is disclosed as being inserted after retainer 38 has been initially positioned within retainer housing 32, the teachings of this invention would also extend to retainers which are moved into retainer housing 32 along with tube 46.

A preferred embodiment of the present invention has been disclosed, however, a worker of ordinary skill in the art would recognize that certain modifications would come within the scope of this invention. For that reason the following claims should be studied in order to determine the true scope and content of this invention.

We claim:

1. A tube coupling comprising:
   a housing defining a bore extending axially inwardly into said housing, said bore having an entrance at an axially outer end of said bore, and an inner flange positioned axially inwardly of said entrance, wherein said inner flange is of greater radial dimension than said entrance;
   a tube received within said bore, said tube having a first outer diameter over the majority of its axial length, and at least one upset portion of greater diameter than said first outer diameter;
   a primary retainer positioned within said bore and having resilient legs extending between axially outer and axially inner ends, said axially outer ends of said legs abutting said inner flange to retain said primary retainer within said bore, and said axially inner ends of said legs abutting an axially outer surface of said at least one upset portion to retain said tube within said bore; and
   a secondary retainer positioned axially outwardly of said primary retainer and having a radially outer clip portion and a radially inner leg portion, said clip portion engaging clip receiving means formed on an outer peripheral surface of said housing to retain said secondary retainer on said housing, and said leg portion abutting an axially outer surface of said at least one upset portion to retain said tube within said bore.

2. A tube coupling as recited in claim 1 wherein said tube has first and second upset portions, said primary retainer legs abutting an axially outer surface of said first upset portion, and said secondary retainer leg portion abutting an axially outer surface of said second upset portion.

3. A tube coupling as recited in claim 2 wherein said second upset portion is positioned axially outwardly of said first upset portion.

4. A tube coupling as recited in claim 1 wherein said clip receiving means comprises an outer flange and an outer channel formed in said outer peripheral surface of said housing, said clip portion abutting said outer flange and being received within said outer channel to retain said secondary retainer on said housing.

5. A tube coupling as recited in claim 4 wherein said secondary retainer further comprises a ring having outer and inner radial extents, said clip portion extending axially inwardly form said outer radial extent of said ring, and said leg portion extending axially inwardly form said inner radial extent of said ring.

6. A tube coupling as recited in claim 5 wherein said clip portion includes a plurality of clip extensions extending generally parallel to said tube, and a plurality of clips extending axially and radially at an angel to said clip extensions, said clips abutting said outer flange and being received by said outer channel on said outer peripheral surface of said housing.

7. A tube coupling as recited in claim 5 wherein said leg portion consists of a plurality of legs extending generally parallel to said tube and abutting an axially outer surface of said second upset portion.

8. A tube coupling as recited in claim 1 wherein said housing is adapted to be connected to a radiator within a vehicle.

* * * * *